UNITED STATES PATENT OFFICE.

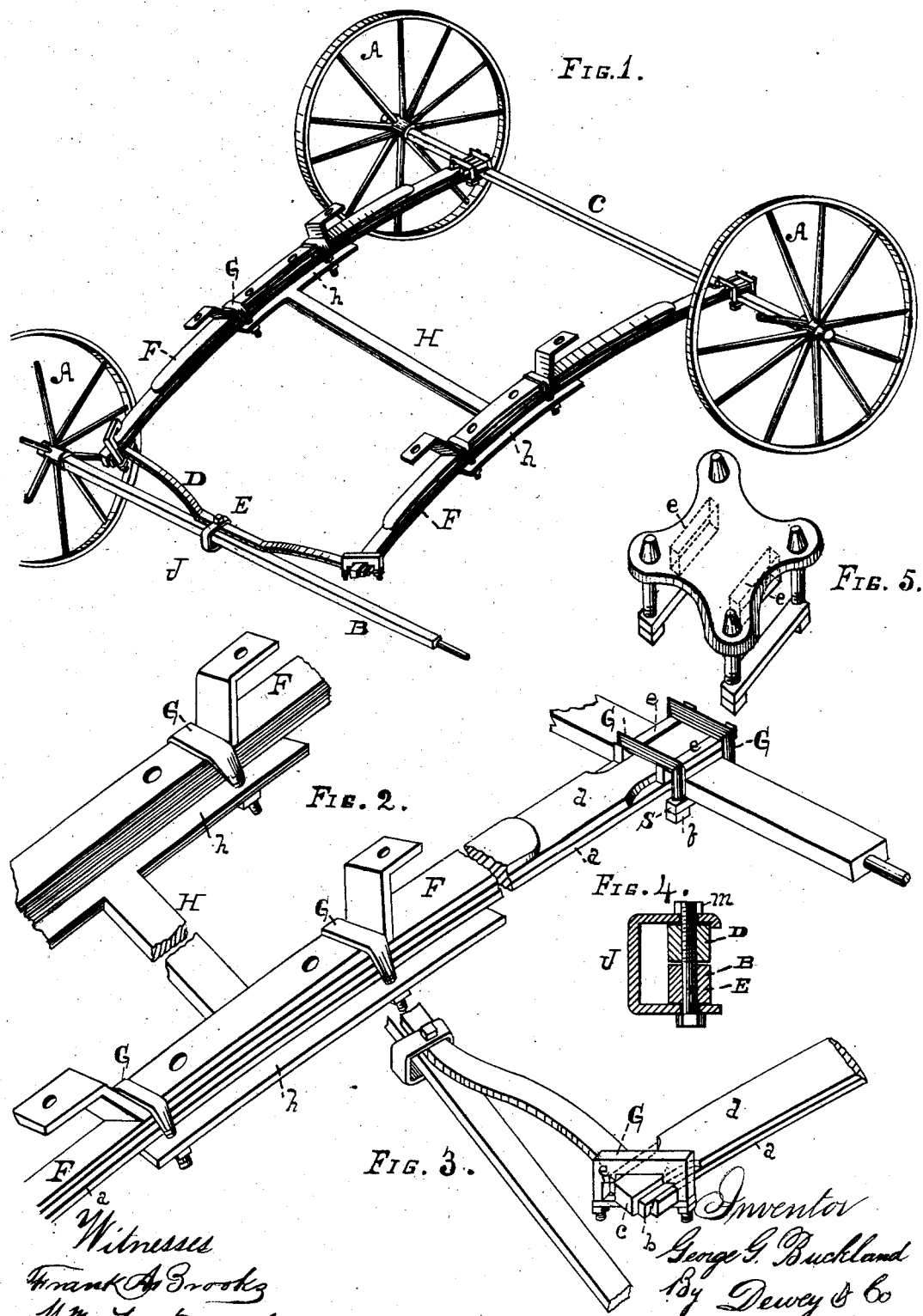

GEORGE G. BUCKLAND, OF TULARE, CALIFORNIA.

VEHICLE-SPRING.

SPECIFICATION forming part of Letters Patent No. 245,129, dated August 2, 1881.

Application filed May 28, 1881. (No model.)

*To all whom it may concern:*

Be it known that I, GEORGE G. BUCKLAND, of the city and county of Tulare, and State of California, have invented an Improvement in Vehicles; and I hereby declare the following to be a full, clear, and exact description thereof.

My invention relates to vehicles, and more especially to certain improvements in the springs and running-gear; and it consists in a means for attaching the springs to the head-block and rear axle; also, in a novel cross-frame and a means for securing it to the springs, and in a support for the king-bolt, all of which will hereinafter fully appear. These improvements are intended to be taken in connection with the invention heretofore secured to me by Letters Patent of the United States, No. 238,847, dated March 15, 1881, reference to which is hereby made.

Referring to the accompanying drawings, Figure 1 shows a perspective of running-gear. Fig. 2 shows an enlarged view of springs, cross-frame, and clips. Fig. 3 shows view of end of springs and clip as fastened to head-block.
Fig. 4 shows vertical section of king-bolt and support. Fig. 5 shows modification of clip.

Let A represent the wheels of a vehicle, B the front axle, and C the rear axle. The head block or bolster D is formed of a flat piece of iron turned up at its ends, as shown. It is pivoted to the front axle, B, by the king-bolt E, which is supported in the manner hereinafter shown.

The springs F are formed of as many leaves as desirable. The under or lower leaf, which I here mark *a*, is turned down at both ends to form a hook or clasp, *b*. The next leaf, *d*, is also turned down at its ends to form a similar clasp, *c*, and projects over the lower leaf. The ends of this leaf *d* are narrowed, as shown, so that when lying upon the under leaf the sides of said under leaf are exposed. The rear ends of both leaves fit over the rear axle, C. *e e* represent metal supports, having their ends turned up as shown. These are laid longitudinally upon the exposed sides of the under leaf, Fig. 2. Clips G are then laid transversely across the springs in front of and behind the axle, and rest upon the supports *e e* within the upturned ends thereof, and embrace the springs, passing down on each side and are secured underneath by clip-yokes *s* and nuts *f*. These clip-yokes *s* pass longitudinally under the axle and secure the ends of one clip with the ends of the other. The supports *e e* are high enough to raise the clips G above the leaf *d*, so that they do not touch said leaf, but bear upon the supports, and through them upon the under leaf, *a*, thus securing said under leaf to the axle, while forming a slot for the leaf *d* to pass through. The object of this construction is, first, by making the second leaf, *d*, long enough to reach to, and by means of its catch *c* embrace, the axle, I provide a safeguard in case the under leaf should break. In such a case the leaf *d* would bear the strain and thus render the vehicle safe; second, by allowing the second leaf, *d*, to play through the clips G, I provide for the natural movement of the leaf upon the under one. It can thus spring back and forth as if it were entirely free of the clip G.

The forward ends of the springs are attached directly to the head-block, either in the manner of the rear ends or by means of clips G, which have cast upon them the supports *e e*, whereby they are raised sufficiently to allow the leaf *d* to pass loosely through them while still bearing upon the lower leaf, *a*, and securing it to the head-block.

It is obvious that I may vary the form of the clip, as shown in Fig. 5. In this figure the securing device is a flat casting having the supports or lugs *e e*, for the purpose described, and having bolts passing through and secured below by yokes and nuts. By reason of this construction of the second leaf, *d*, making it long enough to catch the end supports—and narrow enough to expose the under spring, *a*—it makes no difference what form of clip be used provided that it secure the spring while allowing the free play of the second leaf, *d*.

Let H represent the cross-frame, consisting of a single connecting bar or shank and the ends *h*. In my former invention these ends were the same width as the springs. My improvement herein consists in making them wider than the springs. They fit under said springs at their middle. The object of making these ends *h* wider than the springs is to better secure the clips G, which pass down on each side of the springs and through the sides of the ends *h*, and are secured underneath by nuts. I do not need a yoke-clip by this construction. The ends *h* answer this purpose, and there is no danger of slipping. This forms a strong support and binds the cross-frame firmly to the springs.

The head block or bolster D is pivoted to the forward axle by the king-bolt E, as before mentioned.

J represents a bent metal strip passing from behind the head-block over it and down in front, past and under the axle B. The king-bolt E passes in from below through the strip J and axle B, and is screwed through the head-block, and passes through the strip J again, and is secured above by a nut, *m*, as shown, Fig. 4. This strip J lends support to the king-bolt by fastening it securely both below and above, and thus prevents any play or wear of the parts, which is not the case when the king-bolt is secured at only one end.

With regard to my second improvement of the cross-frame, I am aware that braces of this character have been used to keep the gearing square.

I do not claim a cross-frame broadly, and I am aware that devices have been used to secure and support the king-bolt, and therefore I do not claim, broadly, a support for the king-bolt, but my claims in these regards are upon the construction here shown.

Having thus described my invention, what I claim as new, and desire to secure by Letters Patent, is—

1. The leaf-springs F, having their under leaf, *a*, and second leaf, *d*, turning at their ends to form clasps *b* and *c*, in combination with the rear axle, C, and head-block D, and secured thereto by said clasps fitting over the said rear axle, C, and head-block D, in the manner substantially as described.

2. The leaf-springs F, having their lower two leaves, *a* and *d*, turned at their ends, the leaf *d* being narrowed at its ends, as shown, both leaves being secured to the rear axle, C, and head-block D by clips G, bearing upon supports *e e* or equivalent devices, whereby the leaf *d* is allowed to move upon the leaf *a*, substantially as and for the purpose herein described.

In witness whereof I have hereunto set my hand.

GEORGE G. BUCKLAND.

Witnesses:
 S. H. NOURSE,
 WM. F. BOOTH.